Sept. 8, 1959 KIMIHARU NOYORI 2,902,911
HAND-HELD FUNDUS-OCULI-CAMERA
Filed Aug. 11, 1955
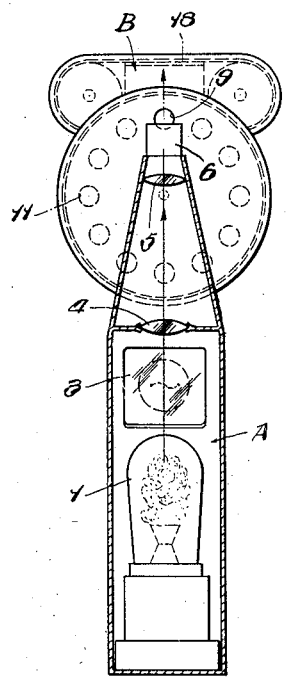
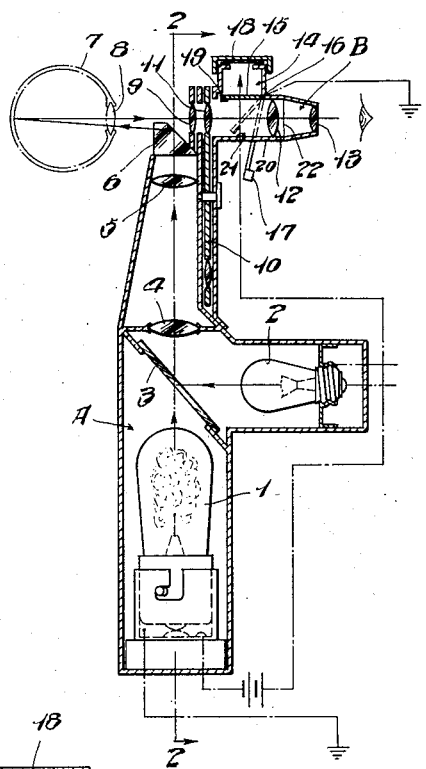
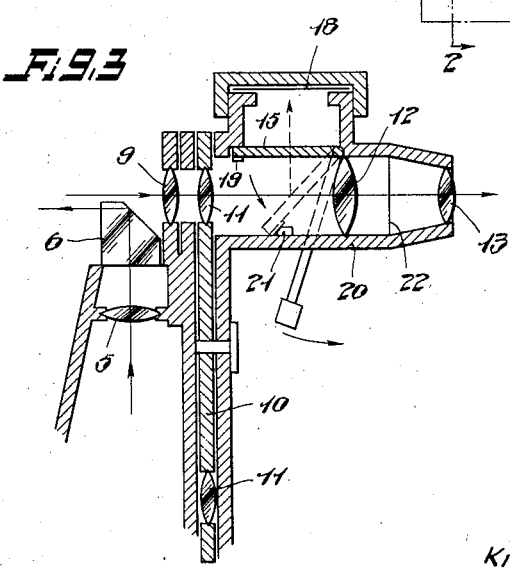
INVENTOR.
KIMIHARU NOYORI

United States Patent Office 2,902,911
Patented Sept. 8, 1959

2,902,911

HAND-HELD FUNDUS-OCULI-CAMERA

Kimiharu Noyori, Shibuyaku, Tokyo, Japan

Application August 11, 1955, Serial No. 527,790

Claims priority, application Japan August 27, 1954

1 Claim. (Cl. 95—11)

The present invention relates to a fundus camera or more particularly to a hand-held type of fundus camera by means of which an examiner can take photographs of a fundus oculi as required while he is examining it.

The object of the present invention is to obtain a small type of fundus camera which is light in weight and easy to handle.

Almost all of the fundus cameras which are being used today are those of Zeiss-Nordenson or their improved types. The camera according to the present invention is not so different in size from an ordinary electric ophthalmoscope, can be held with a single hand very close to the examinee's eye and can simultaneously correctly photograph the fundus by being operated with a pointing finger while the fundus is being examined.

According to the present invention, the camera body comprises a light source part and a camera part. In said light source part, a miniature electric bulb for aiming and a small type flash bulb for photographing are arranged in positions symmetrical with each other. A piece of transparent glass is disposed as inclined at an angle of 45 degrees in a position where both light pencils intersect each other at right angles so that a part of the light pencil from the miniature bulb may be reflected by said transparent glass, the greater part of the light pencil of the flash bulb may penetrate through the transparent glass and these light pencils may pass through a condenser lens system, may be further turned at right angles by a right prism, may enter the eyeball through the lower half of the pupil of the eye being examined and may thus illuminate the fundus. The light axis of said camera part is disposed almost in parallel with the axis of the light pencil from the light source part, and a Recoss lens is disposed just after a main lens opposite the eye being examined so that the light pencil which has passed both lenses may proceed in a straight line and may be observed by the examiner or may be reflected on a movable reflector and the image of the retina on the fundus of the examinee may be formed on the film. The movable reflector will allow the light pencil from the fundus to proceed straight to the examiner without interruption at the time of observation, but will occupy a position intersecting the light pencils at an angle of 45 degrees, and will at the same time allow the image of the retina on the fundus to be formed on the film as a strong light is emitted the moment the circuit of the flash bulb is closed at the time of photographing. It is convenient, in case of continuously photographing under the same condition, to use a xenon electronic flash lamp as the flash bulb. If colour films are used, fundus photographs more useful in clinics will be obtained.

An embodiment of the present invention shall now be explained with reference to the drawings.

Fig. 1 is an axially sectioned view showing the mechanism of a hand camera according to the present invention.

Fig. 2 is a front view of the camera as sectioned on line 2—2 in Fig. 1.

Fig. 3 is a detailed sectional view of the camera part.

This camera comprises light source part A and camera part B. Light source part A is provided with small type flash bulb 1 as a light source for illumination. These bulbs are arranged in directions intersecting each other at right angles. Transparent glass 3 is set in a position where light pencils from both light sources intersect each other at right angles. Said glass 3 reflects a part of the light pencil of miniature bulb 2 and passes the greater part of the light pencil of flash bulb 1. Flash bulb 1 and miniature bulb 2 are arranged in positions symmetrical with each other with respect to glass 3. The light pencil coming out of bulb 2 is reflected by glass 3 as if it came out of flash bulb 1, is condensed by condenser convex lenses 4 and 5 arranged on the light axis of flash bulb 1, is turned at right angles by right prism 6, passes through the lower half of pupil 8 of examinee's eye 7 and circularly illuminates the fundus.

Short focus lens 9 in the plane opposite eye 7 being examined and desired lens 11 on variable lens disc 10 are arranged in camera part B. A set of eye-piece lenses 12 and 13 for observation is disposed on the same light axis as of said lenses 9 and 11. Movable reflector 15 is set below dark box 14. Said movable reflector 15 can be rotated in the direction shown by the arrow around shaft 16 as a pivot, will occupy the position shown by the solid line and will allow the light pencil which has passed through the main lens 9 to proceed straight at the time of observation but will be inclined by means of lever 17 so as to make an angle of 45 degrees with the light axis of main lens 9, will occupy the position shown by the dotted line, will thus turn the light pencil from the main lens at right angles and will allow the image of the retina on the fundus of the eye being examined to be formed on film 18 at the time of photographing. Contact point 19 is provided at the forward end of reflector 15 so as to come into contact with the other contact point 21 or lens tube 20, close the circuit of flash bulb 1 and emit a flash when reflector 15 has been inclined by an angle of 45 degrees. Cross 22 for aiming is provided on the light axis of main lens 9 so as to be in the same focal plane as film 18 with respect to movable reflector 15. The image on said axis will be formed on film 18 when reflector 15 is inclined by an angle of 45 degrees. In the present camera, the distance between main lens 9 and the plane of film 18 is made equal to the focal distance of the main lens. Therefore, when the present camera is used as held close to the eye which is to be examined (the distance between the main lens and the top of the cornea being usually about 10 mm.), in the case of an emmetropia, the rays from the fundus being parallel, the image of the fundus thus obtained will be clearly formed on the surface of the film without the addition of the variable lens. Main lens 9 is proper with a focal distance of around 30 mm. according to the invention. In the case of an emmetropia, the range of two papilla diameters of the retina will form an image of a diameter of about 12 mm. on the film surface. Variable lens disc 10 is a so-called Recoss lens disc and is made of many lenses of a small diameter of 0~±30 dptr. arranged on the periphery of a rotary disc so as to be positioned on the same light axis as of the main lens 9. Though it is convenient in design and manufacture to provide the main lens and the Recoss disc as separated, both can be conveniently combined into a single lens.

In using the camera of the present invention, miniature bulb 2 for illumination is first lighted and the camera is held close to the eye being examined so as to send the light in through the lower half of the pupil and to light up the retina, the retina being thus observed through eye-pieces 12 and 13. In case that the eye to be examined is not an emmetropia but has a refractive error, variable lens disc 10 is properly rotated so as to correct the refractive error, adjustment is made so as to form a clear image on the surface having the cross and then lever 17 is pulled with a pointing finger to move reflector 15 to the position shown by the dotted line. Then the light pencil through the main lens will form the image on the film and at the same time flash bulb 1 will be flashed to expose the film to the light. If a xenon electronic flash lamp is used for the flash light source, it will be unnecessary to exchange bulbs every time of photographing and many photographs can be consecutively taken very easily and surely.

I claim:

A portable fundus oculi camera comprising a casing, illuminating means in said casing, an optical system including a prism disposed in said casing, reflecting means directing a light pencil from said illuminating means toward said prism and thence to a fundus oculi to be examined, said illuminating means including a flash bulb for providing illumination of relatively great intensity positioned at one side of said reflecting means, said illuminating means further including a light bulb positioned at the other side of said reflecting means at right angles to said flash bulb, a main lens in the path of said light pencil coming from said fundus oculi and provided opposite the eye to be examined, said main lens being of extremely short focal distance, a rotatable Recoss disc provided with a plurality of lenses positioned rearwardly of said main lens and fitted in said casing for rotation by a finger of a hand holding said camera, said casing being provided with an observation opening, and photographic means on said casing, said casing having an aperture communicating with said photographic means, said photographic means including a movable reflector pivotally supported in said casing and disposed between said Recoss disc and said observation opening, a lever for moving said reflector into the path of said light pencil from said fundus oculi, said reflector normally closing said aperture, a source of electrical power, said reflector having contact means thereon, a contact in said casing, said contact means and said contact being connected to said source of electrical power and said flash bulb so that when said reflector is pivoted to direct the light pencil toward said photographic means said contact means will engage said contact to complete an operative electrical circuit from said source of electrical power to said flash bulb.

References Cited in the file of this patent

UNITED STATES PATENTS

| | | |
|---|---|---|
| 1,741,526 | Kuhl | Dec. 31, 1929 |
| 2,006,007 | Zimmer | June 25, 1935 |
| 2,077,792 | Heine | Apr. 20, 1937 |
| 2,257,331 | Clarke | Sept. 30, 1941 |
| 2,327,612 | Stone et al. | Aug. 24, 1943 |
| 2,441,370 | Pearce | May 11, 1948 |
| 2,478,545 | Pearce | Aug. 9, 1949 |
| 2,586,973 | McMillin | Feb. 26, 1952 |